United States Patent [19]

Grant, Sr.

[11] 4,108,414
[45] Aug. 22, 1978

[54] OUTLET BOX FASTENER

[76] Inventor: Everett A. Grant, Sr., 116 Shaft St., Glace Bay, Nova Scotia, Canada

[21] Appl. No.: 741,663

[22] Filed: Nov. 15, 1976

[51] Int. Cl.² ............................................. A47G 29/02
[52] U.S. Cl. ................................ 248/300; 248/205 R; 248/DIG. 6
[58] Field of Search .................... 248/300, DIG. 6, 27, 248/205; 220/3.5, 3.6, 3.9

[56] References Cited

U.S. PATENT DOCUMENTS

| | | | |
|---|---|---|---|
| Re. 25,593 | 6/1964 | Palmer | 220/3.9 |
| 1,601,291 | 9/1926 | Burkhard | 248/DIG. 6 |
| 2,386,887 | 10/1945 | Eckel | 248/300 X |
| 2,448,359 | 8/1948 | Davison | 248/27.1 |
| 2,568,942 | 9/1951 | Bindel | 248/27 |
| 2,586,728 | 2/1952 | Shepard | 248/27.1 |
| 2,635,778 | 4/1953 | Dieffenderfer et al. | 220/3.6 |
| 2,665,865 | 1/1954 | Bell | 248/DIG. 6 |
| 2,751,173 | 6/1956 | Fredriksen | 248/300 X |
| 3,115,265 | 12/1963 | Mulkey et al. | 220/3.5 |
| 3,184,191 | 5/1965 | Esoldi | 248/27 |
| 3,268,189 | 8/1966 | Ducharme | 248/27 |
| 3,315,924 | 4/1967 | Greenwood | 248/27 |
| 3,337,168 | 8/1967 | Albrecht | 248/27.1 |
| 3,362,667 | 1/1968 | Ginsburg | 248/300 X |
| 3,424,332 | 1/1969 | Pimentel | 220/3.6 |
| 3,468,448 | 9/1969 | McHollan et al. | 220/3.6 |

*Primary Examiner*—Roy D. Frazier
*Assistant Examiner*—Peter A. Aschenbrenner
*Attorney, Agent, or Firm*—Beveridge, DeGrandi, Kline & Lunsford

[57] ABSTRACT

A fastener for securing an electrical switch or outlet box in an opening in a wallboard or similar wall surface. The fastener can be formed, for example, of metal and includes a first surface adapted to be positioned flush against the interior surface of the wallboard, a second surface which extends rearwardly from the wallboard substantially perpendicular to the first surface and which is adapted to be positioned against one side of the outlet box, and one or more fingers which initially are substantially coplanar with the first surface and so are adapted initially to extend parallel to the wallboard, into the opening of the wallboard in which the outlet box is fitted. The fingers are bent outwardly around the side edge of the wallboard created by the outlet box opening. A fastener is positioned at one, and preferably at each, side of the outlet box opening, and the outlet box is inserted into the opening. The fingers of each fastener are then bent over the front edge of the outlet box to lie against the interior of the outlet box side surface. The outlet box is thus retained in the opening by the cooperation of the fasteners first surfaces, which abut the wallboard interior surface, and flanges which conventionally extend vertically from the outlet box top and bottom surfaces and which thus abut the wallboard exterior surface.

2 Claims, 6 Drawing Figures

OUTLET BOX FASTENER

The present invention pertains to a fastener for securing electrical outlet or switch boxes in a wall. More particularly, the present invention relates to an improved mounting fastener which securely holds an outlet or switch box in an opening in wallboard, paneling or a similar wall member without the necessity of fastening the outlet box to a stud or other permanent support.

Electrical outlets and switches are generally mounted within a box to which the necessary wiring is brought and which holds the outlet or switch in the desired position. These outlet or switch boxes have, in the past, generally been secured to a stud or other such support member. As a consequence, heretofore either it has been necessary to locate outlet and switch boxes in positions determined by the locations of studs and joists or it has been necessary to put a suitable stud or other support member in each location at which an electrical outlet or switch is desired. While such additional studs can be positioned without undue difficulty during the initial construction of a house or other building, during remodeling the addition of a stud in order to support an electrical outlet or switch box can be a major task.

Electrical outlet and switch boxes come in a variety of shapes, including rectangular, hexagonal and others. Fasteners in accordance with the present invention can be provided to support outlet or switch boxes of any shape. In the following detailed description and drawings, a substantially rectangular outlet box is described; however, with appropriate modification the fastener of the present invention can be utilized with electrical outlet or switch boxes of other shapes. Generally, the electrical outlet and switch boxes include a first vertical flange extending from the front of the box upper surface and a second vertical flange extending from the front of the box lower surface. Conventionally, these flanges have openings for screws or other fastening devices to permit fastening of the electrical outlet or switch box to a stud of other support member.

The present invention is a fastener for securing electrical outlet or switch boxes in a wall member at any desired location without the necessity of fastening the outlet box to a stud or other such support. In accordance with the present invention, a fastener of, for example, metal includes a first surface member adapted to be positioned flush against the interior surface of the wallboard, paneling or other wall material, a second surface member which extends rearwardly from the wallboard substantially perpendicular to the first surface and which is adapted to be positioned against one side of the outlet box, and one or more finger members which initially are substantially coplanar with the first member and so are adapted initially to extend parallel to the wallboard, into the opening of the wallboard into which the outlet box is to be fitted. The fingers are bent around the side edge of the wall member created by the outlet box opening. Such a fastener is positioned at one, and preferably at each, side of the outlet box opening, and the outlet box is inserted into the opening. The fingers of each fastener are then bent over the front edge of the outlet box to lie against the interior of the outlet box side surface. The outlet box is thus retained in the opening by the cooperation of the fastener first surface, which abuts the wallboard interior surface, and the flanges which conventionally extend vertically from the outlet box top and bottom surfaces and which thus abut the wallboard exterior surface. It is accordingly seen that the fastener of the present invention can be easily manipulated to permit quick and efficient installation of outlet or switch boxes in any desired location. Such installation thus requires significantly less time and, therefore, expense.

These and other aspects and advantages of the present invention are more apparent in the following detailed description and claims, particularly when considered in conjunction with the accompanying drawings in which like parts are designated by like reference numerals. In the drawings:

Figure 1:
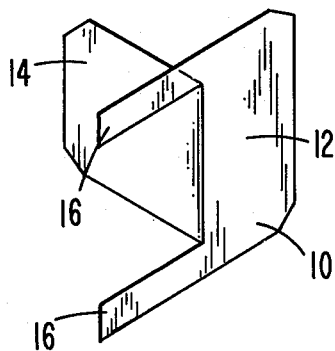
FIG. 1 is a perspective view of a preferred embodiment of a fastener in accordance with the present invention showing a preferred shape before installation.

As seen in FIG. 1, fastener 10 is preferably made from a single sheet of material and includes a first surface member 12, a second surface member 14, which is substantially perpendicular to the first surface member, and one or more finger members 16 which extend in substantially the same plane as first surface member 12 and to the opposite side of second surface member 14. Fastener 10 may be made of metal or other similar material which can be readily bent and will retain its bent shape. The overall size of fastener 10 or of any portion thereof may be selected to accommodate different size outlet boxes and wall openings.

Figure 2:
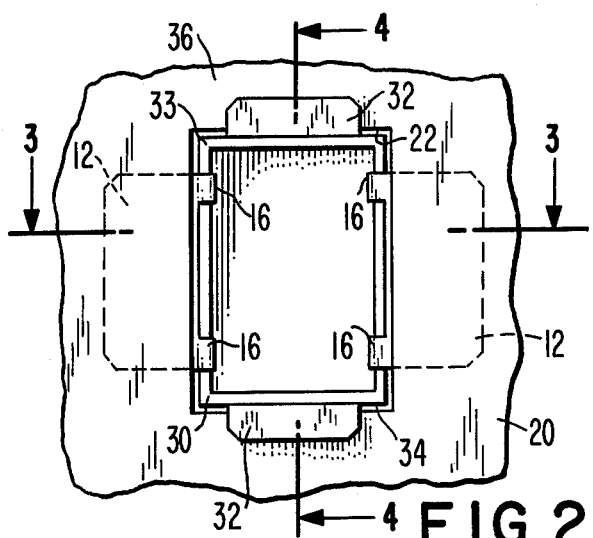
FIG. 2 is a front plan view of an outlet box installed in an opening in a wallboard or similar wall surface by means of two fasteners in accordance with the present invention.

As depicted in FIG. 2, a wall member 20, which may be of any suitable dimension or construction, such as wallboard, paneling, wood or plaster, has cut therein an outlet box opening 22 of the usual type. Opening 22 is of a size and shape to loosely receive electrical outlet or switch box 30. Conventionally outlet box 30 includes vertically projecting flanges 32 fixedly mounted to extend at about a 90° angle from the front of each of upper surface 33 and lower surface 34 of box 30. When outlet box 30 is inserted into opening 22, flanges 32 contact the exterior surface 36 of wall member 20 adjacent upper surface 33 and lower surface 34 of the outlet box. Outlet box 30 may be made of any suitable material, typically metal.

Figure 3:
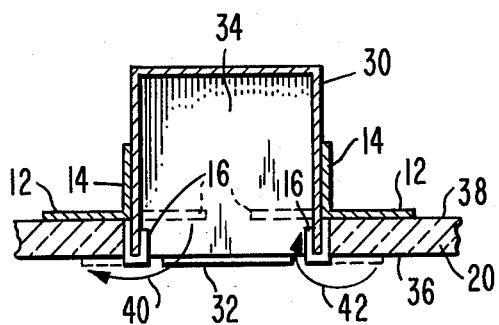
FIG. 3 is a sectional view taken along line 3—3 of FIG. 2.

Referring to FIG. 3, to install an electrical outlet or switch box 30 with fasteners 10, a fastener 10 is inserted into opening 22 so that its first surface member 12 is positioned flush against the interior surface 38 of wall member 20 to one side of opening 22. With fastener 10 so positioned, the second surface member 14 is substantially perpendicular to wall member 20, extending rearwardly behind the wall member. The protruding finger members 16 which extend from first surface member 12 are also substantially perpendicular to second surface member 14, and initially they extend on the opposite side of the second surface member into opening 22, substantially parallel with wall member 20. Fingers 16 are then positioned adjacent to exterior surface 36 of the wall member. This can readily be accomplished by bending fingers 16 outwardly around the side edge of the wall member created by opening 22, in the direction indicated by arrow 40. With fingers 16 so positioned, fastener 10 readily remains in place without additional support. This feature aids easy and convenient installation of the outlet box, since there is no necessity of other means for holding the fasteners while the outlet box is inserted into the opening. Advantageously, there are two finger members 16 on each fastener, preferably just above and just below second surface member 14. Such design is advantageous since it provides secure fastening of the outlet box at two distinct and separate points, preferably at the top and bottom of each sidewall of the outlet box, thereby minimizing movement of the outlet box. Preferably, a second fastener is mounted in a corresponding manner at the opposite side of the opening 22.

Figure 4:
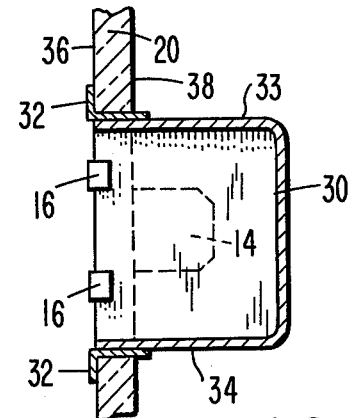
FIG. 4 is a sectional view taken along line 4—4 of FIG. 2.

The outlet or switch box 30 can now be inserted into opening 22 so that flanges 32 are flush against exterior surface 36 at the upper and lower edges of opening 22, as illustrated in FIG. 4. If desired, small depressions can be formed in exterior surface 36 to receive flanges 32 so that when the outlet box is installed flanges 32 are substantially flush with surface 36. With outlet box 30 positioned, second surface member 14 of each fastener 10 is positioned adjacent the exterior surface of a sidewall of the outlet box. The pressure exerted on the second surfce member 14 assures that first surface members 12 of the fasteners securely abut the interior surface 38 of the wall member. Finger members 16 are then bent in the direction indicated by arrow 42, over the front edge of the sidewalls of the outlet box and into the interior thereof, flush against the interior surfaces of the outlet box sidewalls. The outlet box 30 is thus retained in opening 22. The first surface members 12 of the fasteners, which abut the wall member interior surface 38, and outlet box flanges 32, which abut the wall member exterior surface 36, cooperate to securely maintain the position of the outlet box.

Figure 5:
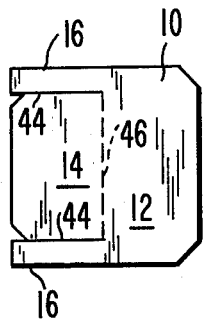
FIG. 5 is an elevational view of a fastener as it may be manufactured in accordance with the present invention.

FIG. 5 illustrates manufacture of a fastener 10 in accordance with the present invention. The fastener is cut from a sheet of material, for example by stamping. In the cutting process, the outer perimeter of the fastener is cut, and the lines 44 between second surface 14 and fingers 16 are cut. In addition, if desired, a line 46 can be scored to define the bend at which first surface 12 meets second surface 14.

Figure 6:
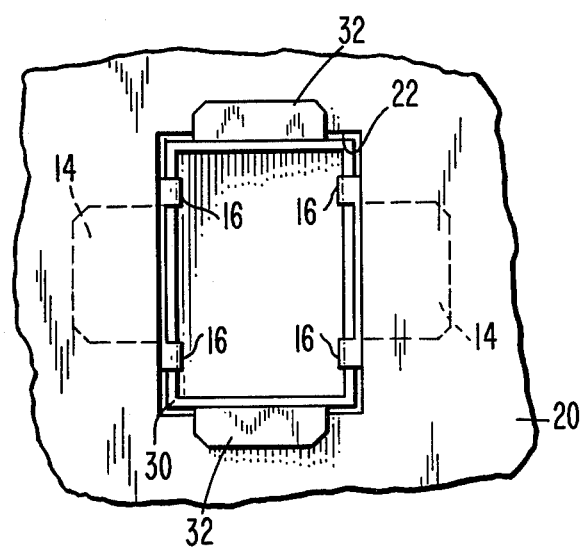
FIG. 6 is a front plan view of the outlet box installed in an alternative manner in an opening in a wallboard or similar wall surface by means of two fasteners in accordance with the present invention.

FIG. 6 depicts an alternate manner of installing outlet box 30 into the opening 22 of the wallboard by use of fasteners in accordance with the present invention. In this alternate manner second surface member 14 abuts the interior surface 38 of the wall member 20, and first surface member 12 extends rearwardly behind the wall member. Fingers 16, which are substantially coplanar with, and extend from, first surface member 12, protrude forward of the wall member 20, passing through opening 22. As fingers 16 are substantially perpendicular to wall member 20, outlet box 30 is inserted into opening 22 without interference, after which the fingers are bent over the front edge of the outlet box to lie against the interior surface of the outlet box sidewall. Alternatively, fingers 16 may be bent around the side edge of the wall member created by opening 22, with the remainder of the installation process as heretofore described.

Although the present invention has been described with reference to a preferred embodiment, alternations and rearrangements can be made, and still the result would be within the scope of the invention.

What is claimed is:

1. Apparatus for securing an electrical outlet in an opening of a wall member, comprising:
   (a) an outlet box having two parallel sidewalls, an upper surface, a lower surface, a first flange extending generally vertically upward from said upper surface, and a second flange extending generally vertically downward from said lower surface, said outlet box positioned within said wall member opening with said flanges flush against the exterior surface of said wall member;
   (b) a pair of fastener members, one fastener member adjacent each sidewall of said outlet box, each fastener member consisting of:
      (1) a substantially planar first surface member positioned flush against the interior surface of said wall member;
      (2) a substantially planar second surface member extending from and generally perpendicular to said first surface member, extending interiorly of said wall member and flush against the adjacent sidewall of said outlet box; and
      (3) two finger members extending from said first surface member, through said opening to the exterior of said wall member, and over the adjacent sidewall of said outlet box into the interior thereof.

2. Apparatus as claimed in claim 1 wherein said members are made of metal.

* * * * *